(12) United States Patent
Baldoni

(10) Patent No.: US 7,001,558 B2
(45) Date of Patent: Feb. 21, 2006

(54) COUNTER TOP MOLD AND METHOD OF USING SAME

(76) Inventor: Edwin Baldoni, 504 Carnation Dr., Clarks Summit, PA (US) 18411

( * ) Notice: Subject to any disclaimer, the term of this patent is extended or adjusted under 35 U.S.C. 154(b) by 82 days.

(21) Appl. No.: 10/434,875

(22) Filed: May 9, 2003

(65) Prior Publication Data
US 2004/0222550 A1 Nov. 11, 2004

(51) Int. Cl.
*B29C 39/10* (2006.01)
*B29C 39/28* (2006.01)

(52) U.S. Cl. .................. 264/219; 264/259; 264/299; 264/313; 249/139; 249/117; 312/140.3

(58) Field of Classification Search .............. 264/36.2, 264/245–247, 250, 259, 261, 265, 73, 74, 264/219, 299, 313, 317; 52/287.1, 288.1; 249/117, 139, 187.1, 188; 312/140.3, 140.4
See application file for complete search history.

(56) References Cited

U.S. PATENT DOCUMENTS

| | | | |
|---|---|---|---|
| 1,656,422 A | | 1/1928 | Copeman |
| 3,222,749 A | * | 12/1965 | Haas ........................... 249/18 |
| 3,619,457 A | | 11/1971 | Chandler et al. |
| 3,641,228 A | * | 2/1972 | Fleck ........................... 264/53 |
| 4,405,551 A | * | 9/1983 | Barnard et al. ............. 264/245 |
| 4,894,272 A | | 1/1990 | Aisley |
| 5,028,459 A | | 7/1991 | Lathrop |
| 5,253,932 A | * | 10/1993 | Nesovic .................... 312/140.3 |
| 5,260,007 A | * | 11/1993 | Efstratis et al. ................ 264/35 |
| 5,372,869 A | * | 12/1994 | Drexinger et al. .......... 428/174 |
| 5,628,949 A | * | 5/1997 | Bordener .................... 264/161 |
| 5,722,746 A | * | 3/1998 | Hull et al. ............... 312/140.3 |
| 5,766,500 A | * | 6/1998 | Bordener .................... 249/117 |
| 5,868,957 A | * | 2/1999 | Bordener ................. 249/114.1 |
| 5,885,503 A | * | 3/1999 | Bordener .................... 264/254 |
| 5,906,875 A | * | 5/1999 | Bordener ...................... 428/81 |
| D420,748 S | | 2/2000 | Strickland et al. |
| 6,338,229 B1 | * | 1/2002 | Botzen ......................... 52/371 |
| 6,393,788 B1 | | 5/2002 | Flores |
| 6,397,542 B1 | | 6/2002 | Flores |
| 6,503,426 B1 | | 1/2003 | Horwitz |
| 6,607,683 B1 | * | 8/2003 | Harrington .................. 264/227 |
| 6,691,341 B1 | * | 2/2004 | Loch .............................. 4/632 |
| 2002/0108172 A1 | * | 8/2002 | Loch .............................. 4/631 |
| 2003/0003271 A1 | | 1/2003 | Bykov et al. |
| 2004/0261239 A1 | * | 12/2004 | Jecker ....................... 29/401.1 |
| 2005/0045068 A1 | * | 3/2005 | Shimanovich .............. 106/712 |

\* cited by examiner

*Primary Examiner*—Angela Ortiz
(74) *Attorney, Agent, or Firm*—RatnerPrestia

(57) ABSTRACT

A mold for producing a finished countertop on top of a countertop substrate is provided. The mold is comprised of a shaped inner surface to receive a countertop material pour and form a countertop edge and a tab extending from the shaped inner surface, the tab dimensioned to cover at least part of the substrate edge and extend over at least a part of the substrate top and hold the shaped inner surface adjacent the countertop substrate edge. Also included in the invention is a method of making a countertop using the mold.

3 Claims, 9 Drawing Sheets

COUNTER TOP MOLD AND METHOD OF USING SAME

BACKGROUND OF THE INVENTION

Various mold assemblies are known in the art for creating custom countertops according to dimensions defined by the space needing the countertop and subsequently fixed by the size of the given mold. Many molds are popular for the production of standard sized countertops and allow for relatively high production rates. Unfortunately, most open type molds do not allow for the production of a countertop having a thickened outer edge as is desired by most consumers. The thickened edge typically is formed as a decorative, round or arc shaped contour and provides the combined advantages of comfort and safety and significantly higher aesthetic value while also hiding from view the supports which are typically attached to the underside of the countertop and by which the countertops are attached atop a cabinet.

Closed molds are also known and used and usually consist of a top half and a bottom half which are clamped or press-fit together prior to the mold being filled with an appropriate resin matrix or other type material. The closed type mold can be configured for producing a countertop with a thickened edge however its primary disadvantage is that it only produces a countertop according to the dimensions fixed by the size of the mold. Therefore, a differently dimensioned closed type mold is needed for producing a countertop according to each different desired specification.

Another type of prior art mold comprises an open mold constructed of a Teflon or other type of "non-stick" surface upon which is shaped a negative impression of the desired countertop. One or more of the inner facing edges of the semi-open mold is shaped as a negative of the rounded countertop edge. The procedure includes the steps of establishing an enclosed barrier which utilizes all or part of the enclosed mold by releasably securing a number of dividers in the arrangement desired. An initial pour is made to produce the top surface of the countertop. Following sufficient drying and gelling of the first pour, an appropriately configured separating bar member is secured atop the first pour in proximity to the inwardly facing edge of the mold and a second resin pour is then applied between the separating bar and the configured inner mold edge to create the thickened edge.

The above described "two-pour" process is an improvement over more traditional utilization of open type molds for creating a countertop product in that it can create a product according to more than one fixed set of dimensions. The major drawback, however, is the amount of time and effort which must be employed in measuring and setting up the mold, including installing the barriers and waiting for the first pour to sufficiently harden to permit the separating member to be attached for the final pour to create the thickened edge. Also, another disadvantage of this type of mold procedure is the low quality of the created product due to uneven thickness and lack of ability to produce straight and evenly consistent thickness of the countertop.

Still yet another challenge with many known molds is that they are not easy to use on site. That is to say, many mold apparati are used in a shop, away from the site at which the countertop will be placed, because of the complexity with moving them and using them on site. Still other molds are designed to be used on site, but are typically arduous to set up and use.

Thus, an improved countertop mold system would be easy to use, allow for quick set-up and pouring, and could be easily used on site, such as in the kitchen of a house being built.

SUMMARY OF THE INVENTION

The present invention provides a mold system which is easy to use, allows for quick set-up and pouring, and can be easily used on site. More specifically, the present invention includes a mold for producing a finished countertop on top of a countertop substrate having a top and an edge. The mold comprises a shaped inner surface to receive a countertop material pour and form a countertop edge, and a tab extending from the shaped inner surface, the tab dimensioned to cover at least part of the substrate edge and extend over at least a part of the substrate top and hold the shaped inner surface adjacent the countertop substrate edge.

Also included as part of the present invention is a method for producing a countertop on top of a countertop substrate having a top and an edge. The method comprises the steps of attaching a mold to a countertop substrate, the mold having a shaped inner surface to receive a countertop material pour and a tab extending from the shaped inner surface dimensioned to extend over at least a part of the countertop substrate top and hold the shaped inner surface adjacent the countertop substrate edge. The method continues by pouring countertop material onto the countertop substrate to cover the top of the countertop substrate not covered by the tab, the mold tab, and the inner surface of the countertop mold. Then once the countertop material sets, the final step is to separated the inner surface of the mold from the tab whereby the tab remains in place between the poured countertop and the countertop substrate.

BRIEF DESCRIPTION OF THE DRAWINGS

The features of the invention believed to be novel and the elements characteristic of the invention are set forth with particularity in the appended claims. The figures are for illustration purposes only and are not necessarily drawn to scale. The invention itself, however, both as to organization and method of operation, may best be understood by reference to the detailed description that follows taken in conjunction with the accompanying drawings in which:

DETAILED DESCRIPTION OF THE INVENTION

As noted above, the present invention provides a mold system which is easy to use, allows for quick set-up and pouring, and can be easily used on site. More specifically, the present invention includes a mold for producing a finished countertop on top of a countertop substrate having a top and an edge. The mold comprises a shaped inner surface to receive a countertop material pour and form a countertop edge, and a tab extending from the shaped inner surface, the tab dimensioned to cover at least part of the substrate edge and extend over at least a part of the substrate top and hold the shaped inner surface adjacent the countertop substrate edge.

Figure 1:
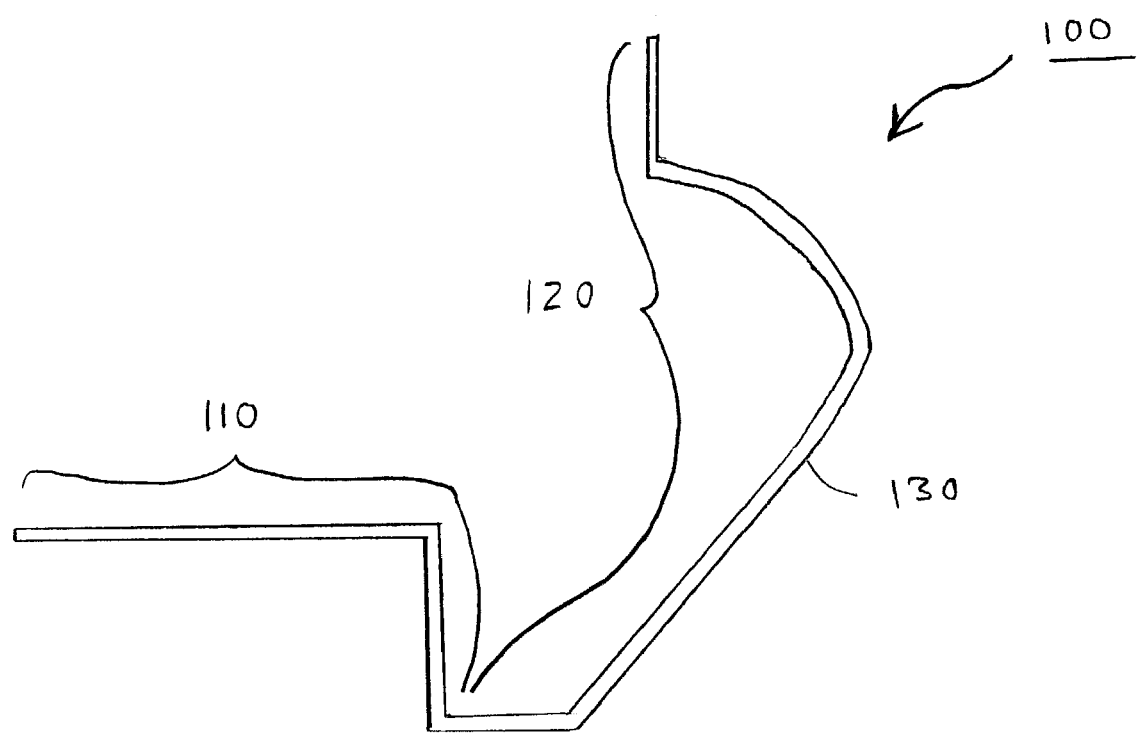
FIG. 1 is a cross-sectional side view of a mold in accordance with the present invention.
Figure 2:
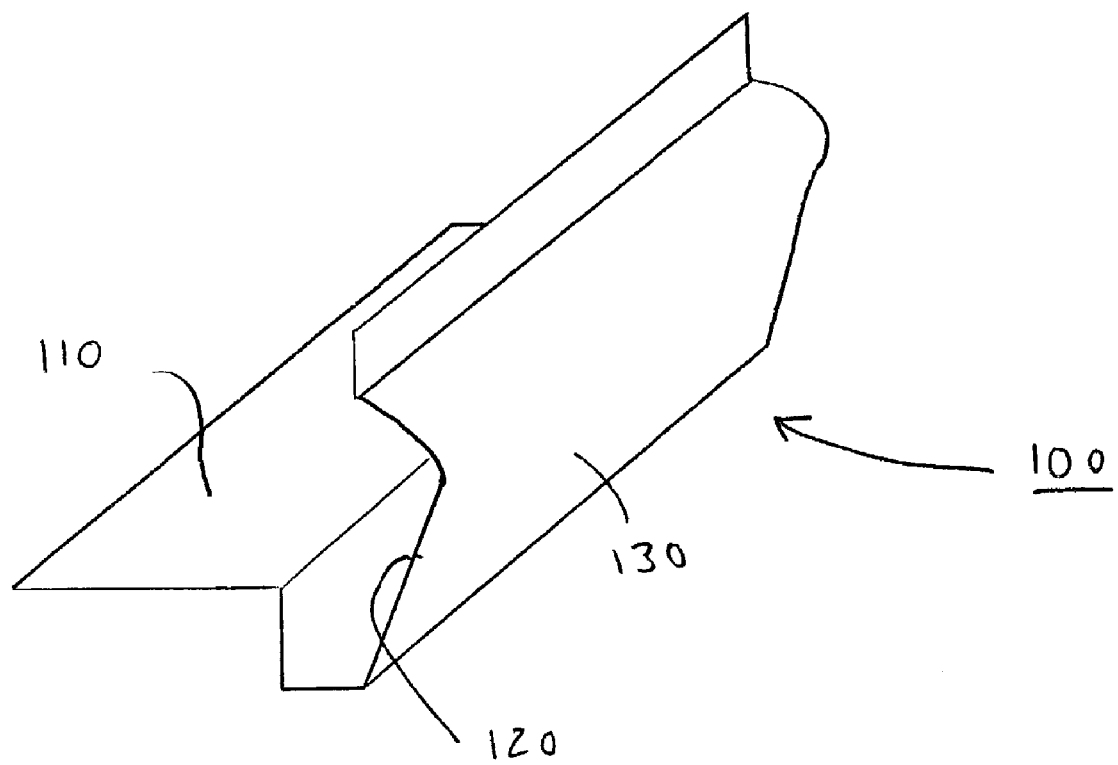
FIG. 2 is an orthogonal view of the mold of FIG. 1.
Figure 3:
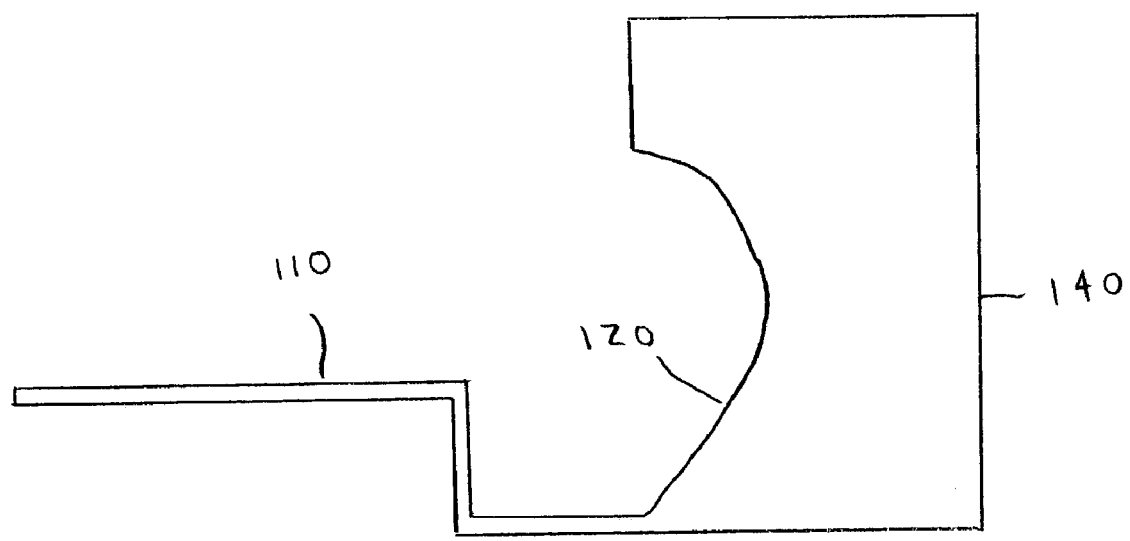
FIG. 3 is a cross-sectional view of an alternative embodiment of a mold in accordance with the present invention which has the same tab and inner surface configuration as the mold shown in FIG. 1.

FIG. 1 shows mold 100 having tab 110, inner surface 120, and outer surface 130. In the embodiment of FIG. 1, outer surface 130 has the same shape as inner surface 120. FIG. 2 shows an orthogonal view of mold 100. FIG. 3 shows an alternative embodiment of mold 100 having a square outer surface 140. For reasons of economics and manufacturing, the embodiment of FIG. 1 is preferred over that of FIG. 3, although both are considered a part of the present invention.

Figure 4A:
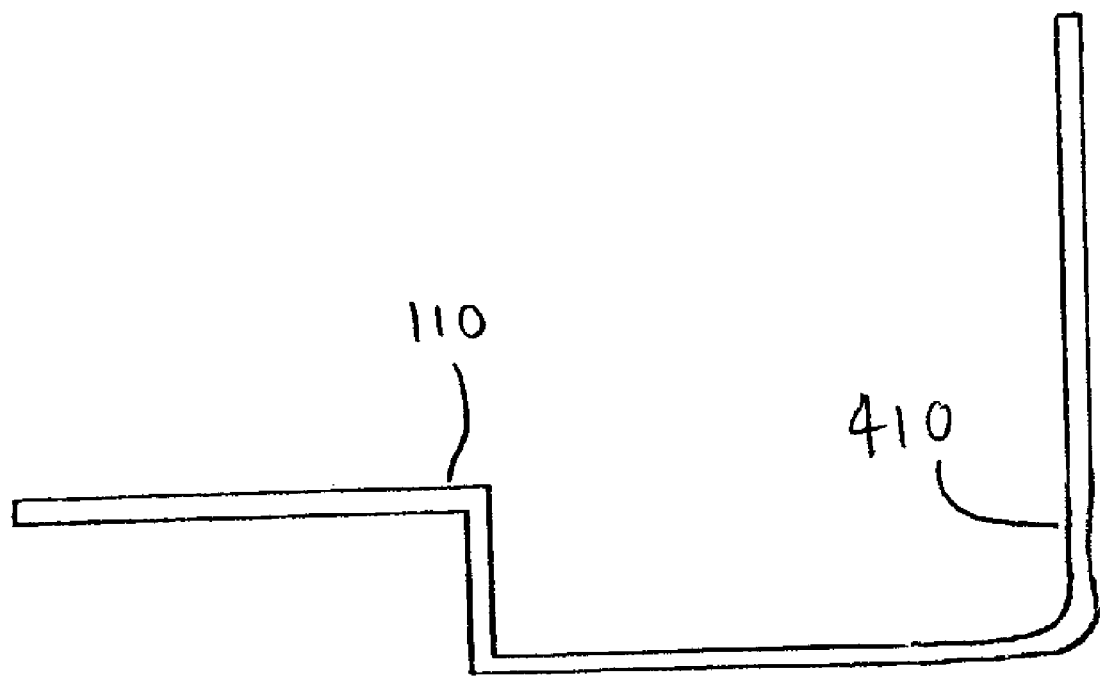
FIGS. 4A and 4B show alternative embodiments of a mold in accordance with the present invention having inner surfaces of different shapes for forming countertops with different edge designs.
Figure 4B:
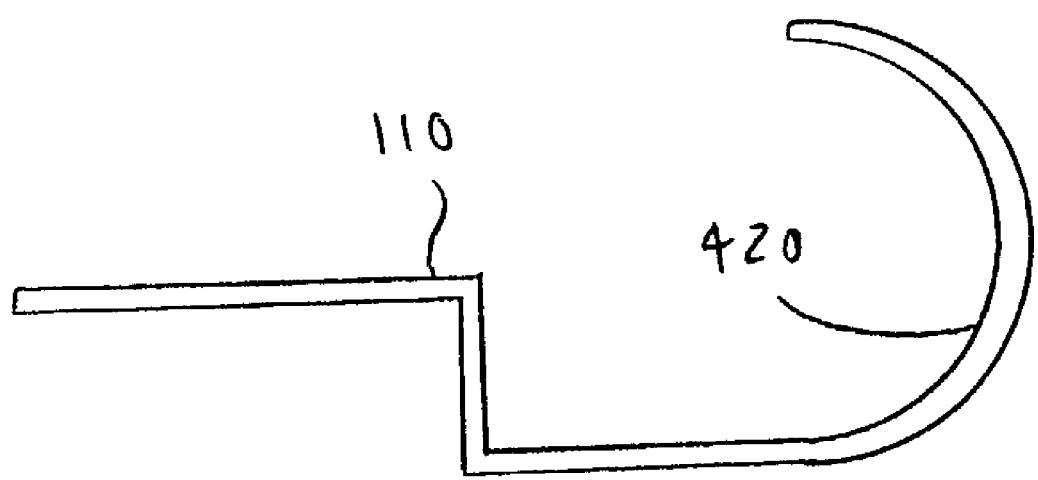

FIGS. 4A and 4B show alternative embodiments of mold 100 which have inner surfaces 410 and 420 which differ in shape from that embodiment of FIG. 1. These molds produce countertops with different edge designs, and any number of other such shapes could be envisioned by one skilled in the art. FIG. 4A shows a square mold and FIG. 4B shows what is typically referred to as bullnose shape. Typically, tab 110 ranges in width of from 1 to 3 inches, and is preferably 1½". The mold inner surface dimension will vary depending on its shape, but will normally be on the order of between 1 and 3 inches in width, preferably about 2 inches, and between 1 and 3 inches in height, preferably about 2 inches. The mold will be perhaps best understood by seeing how it is used in the method of the present invention.

The method comprises the steps of attaching a mold to a countertop substrate, the mold having a shaped inner surface to receive a countertop material pour and a tab extending from the shaped inner surface dimensioned to extend over at least a part of the countertop substrate top and hold the shaped inner surface adjacent the countertop substrate edge. The method continues by pouring countertop material onto the countertop substrate to cover the top of the countertop substrate not covered by the tab, the mold tab, and the inner surface of the countertop mold. Then once the countertop material sets, the final step is to separate the inner surface of the mold from the tab whereby the tab remains in place between the poured countertop and the countertop substrate.

Figure 5:
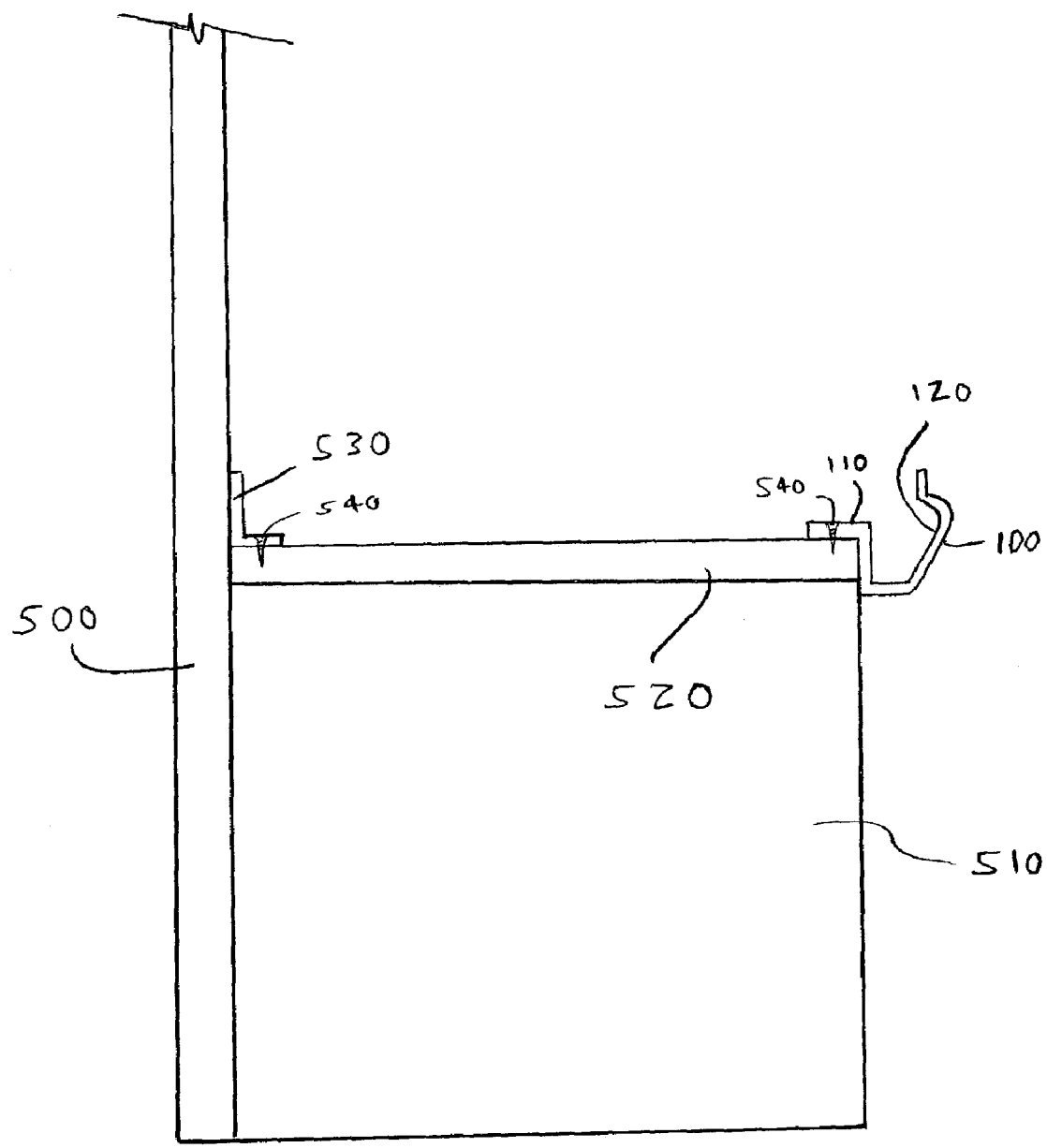
FIGS. 5–7 show the stepwise progression of using the mold to make a counter top in accordance with the method of the present invention.
Figure 6:
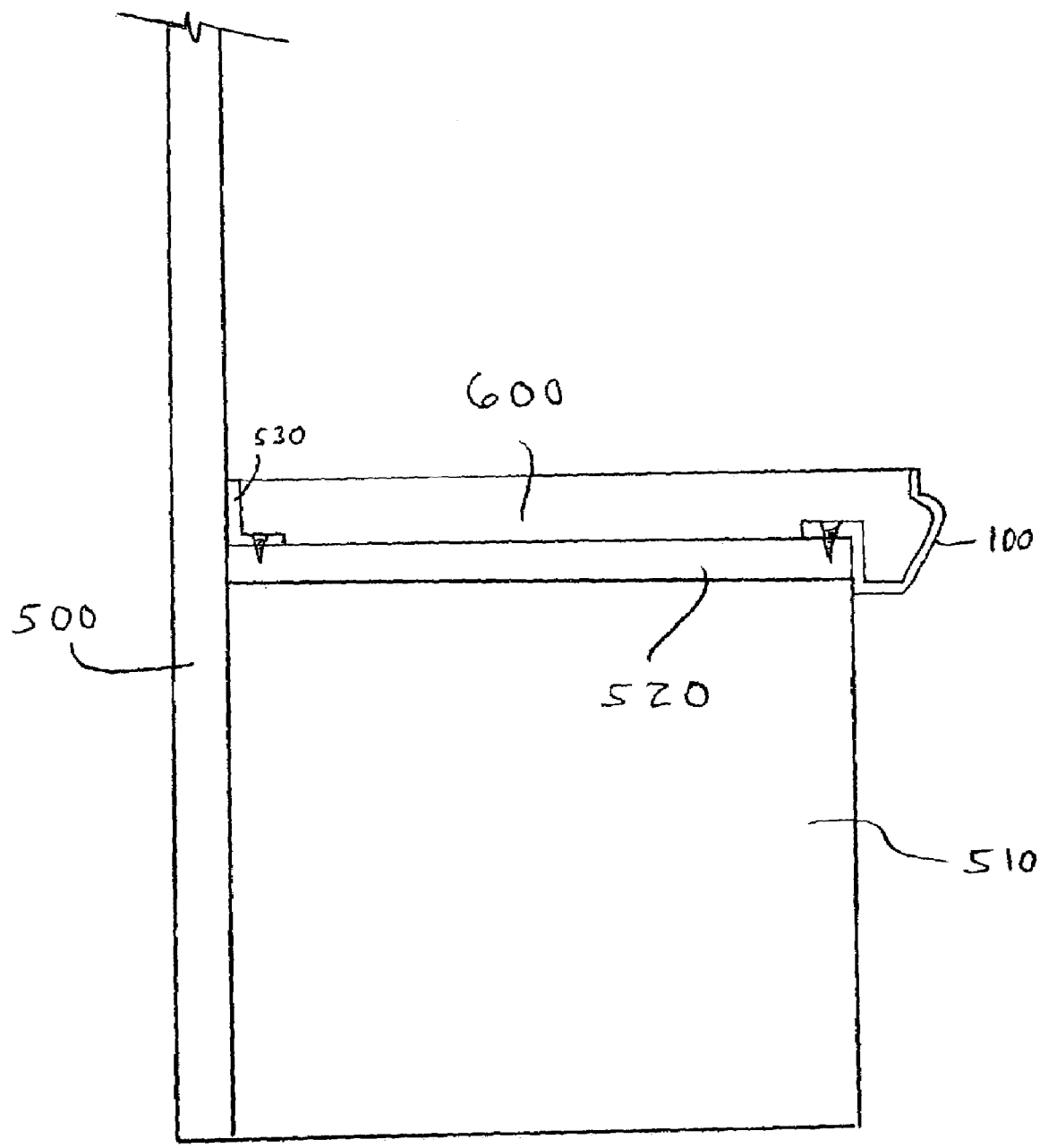
Figure 7:
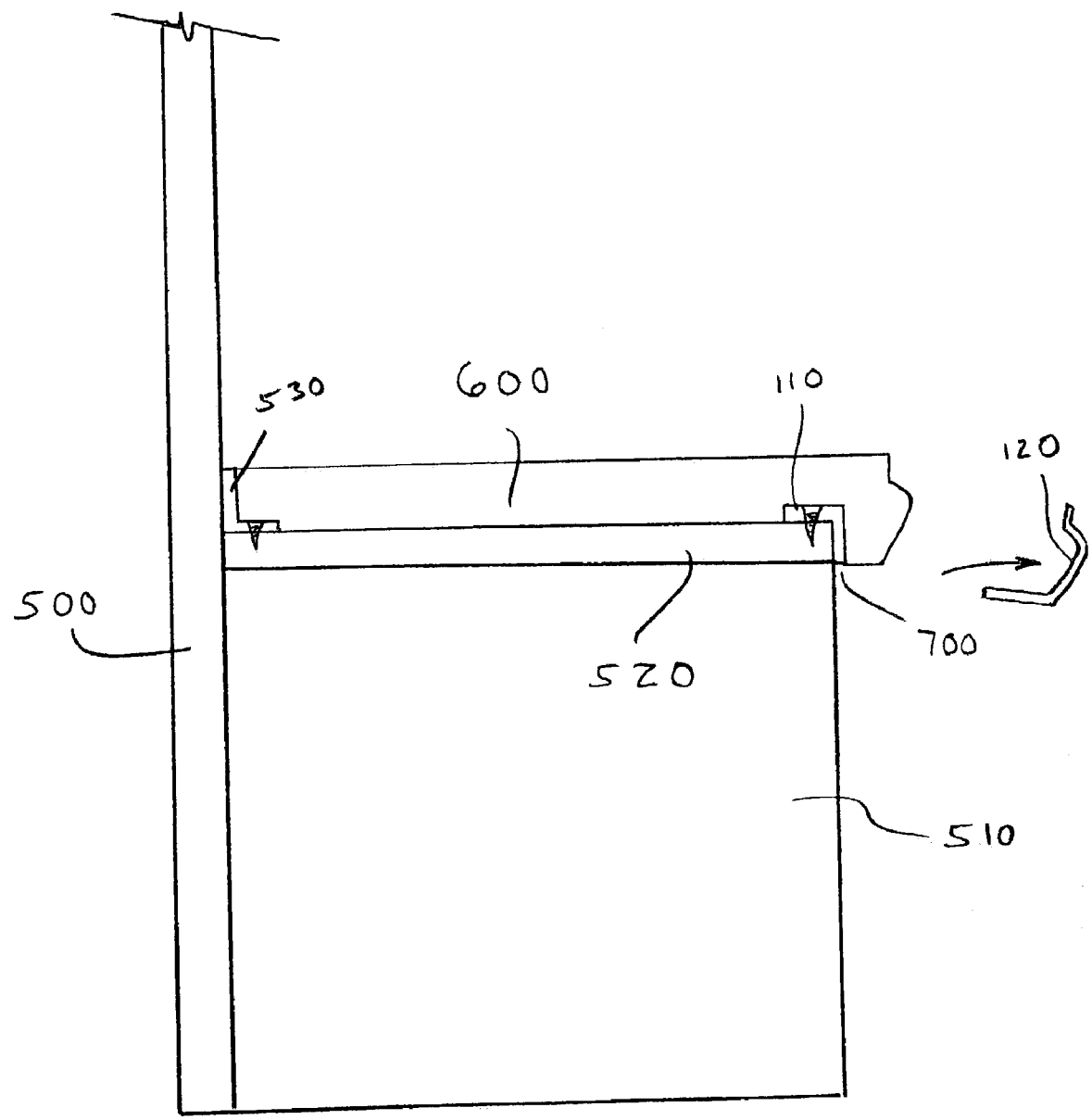

FIGS. 5–7 show the general steps followed in the method of using the mold to form a countertop. FIG. 5 shows wall 500 with cabinet 510 in place. Atop cabinet 510 is countertop substrate 520, which is typically plywood or some other suitable support material upon which a countertop can be placed. As can be seen in FIG. 5, mold 100 is in place on substrate 520. Along wall 500 is placed another mold, wall mold 530, which is essentially just a tab. Mold 100 and wall mold 530 attached to substrate 520 with screws 540. Other attachment means could be used, however, such as adhesives or nails. Once the necessary molds are in place, the countertop can be poured. Corner molds and other specially shaped pieces would be placed around the entire countertop substrate. Such corner molds, including internal and external counter molds, will be discussed below.

Turning now to FIG. 6, countertop material has been poured to form countertop 600. Materials used for the countertop are known to those skilled in the art, and include colored concrete and other such products. Methods used to pour are also known, and include conventional techniques of pouring, screeding and vibrating, etc.

FIG. 7 shows the final product after tab 110 has been separated from the part of mold 100 defined by inner surface 120. This separation would typically occur at location 700 as shown on FIG. 7, and would be done with a knife or saw. What remains are wall mold 530 and tab 110 of mold 100, both pieces of which are essentially unseen. Thus, countertop 600 not only has no visible mold pieces, but appears much thicker to a viewer than it actually is.

Figure 8:
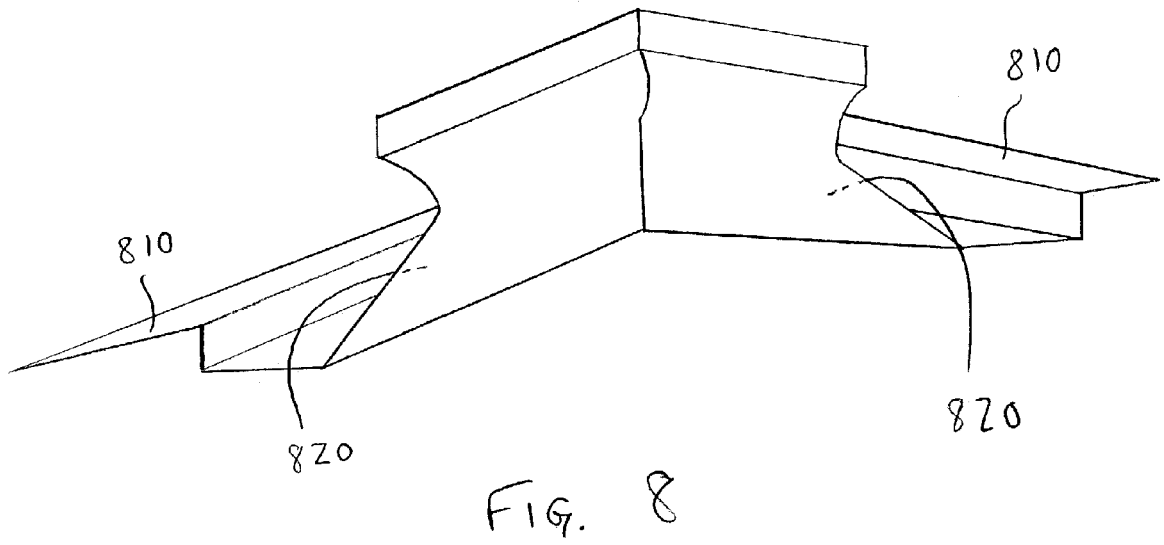
FIGS. 8 and 9 show an orthogonal view of an internal corner mold and an external corner mold, respectively.
Figure 9:
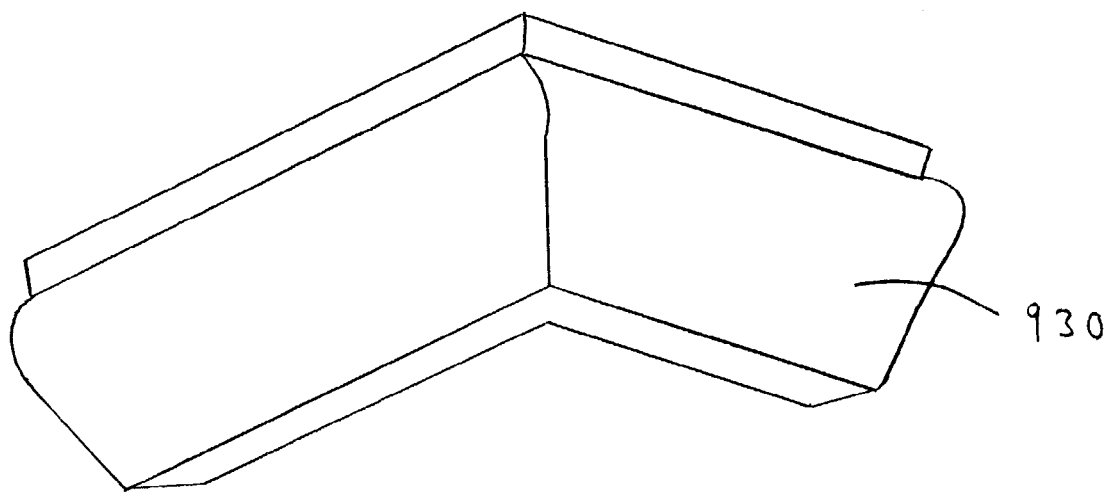

As noted above, corner mold pieces can easily be constructed in accordance with the present invention. This is a particular advantage when it comes to on site preparation and pouring because, unlike molds of the prior art, corner pieces of this invention can be pre-fabricated, preferably by extrusion molding from suitable polymers, which obviates the need for mitering corners on site. This also allows for smoother corners, something not achieved by mitering straight pieces. FIG. 8 shows an example of an internal corner mold 800 in accordance with the present invention. Note tab 810 and internal surface 820. FIG. 9 shows an example of an external corner mold 900 with outer surface 930. These corner molds are at 90°, although 45° and other angled molds could easily be manufactured in accordance with the present invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An edge mold for on site production of a finished countertop on top of a countertop substrate having a top and an edge, the edge mold comprising:

a shaped inner surface portion to receive a countertop material pour to form and shape a countertop edge; and a flexible tab portion extending from the shaped inner surface and separable therefrom to remain with the countertop after shaping of the countertop edge, the tab portion dimensioned to cover at least part of the substrate edge and extend over at least a part of the substrate top and hold the shaped inner surface portion adjacent the countertop substrate edge;

wherein the edge mold is plastic; and further wherein the edge mold has a first section which extends longitudinally in a first direction and a second section which extends in a second direction 90° from the first direction.

2. An edge mold for on site production of a finished countertop on top of a countertop substrate having a top and an edge, the edge mold comprising:

a shaped inner surface portion to receive a countertop material pour to form and shape a countertop edge; and a flexible tab portion extending from the shaped inner surface and separable therefrom to remain with the countertop after shaping of the countertop edge, the tab portion dimensioned to cover at least part of the substrate edge and extend over at least part of the substrate top and hold the shaped inner surface portion adjacent the countertop substrate edge;

wherein the edge mold is plastic;

and further wherein the edge mold has a first section which extends longitudinally in a first direction and a second section which extends in a second direction 45° from the first direction.

3. A method for producing a countertop on top of a countertop substrate having a top and an edge, the method comprising:

provel substrate;
providing a countertop substrate having a top and an edge;
optionally attaching a wall mold to a portion of the countertop substrate;
attaching an edge mold to a portion of the countertop substrate, the edge mold having
a shaped inner surface portion to receive a countertop material pour, and
a tab portion extending from the shaped inner surface portion and dimensioned to extend over at least a part of the top of the countertop substrate and a part of the edge of the countertop substrate to provide a shaped inner surface adjacent the countertop substrate edges, whereby the top of the countertop substrate remains substantially exposed;

pouring countertop material onto the countertop substrate to cover the top of the countertop substrate and fill the shaped inner surface portion of the edge mold;

allowing the countertop material to set;

separating a portion of the edge mold from the countertop substrate by cutting the shaped inner surface portion from the tab portion whereby the undetached part of the edge mold remains in place between the poured countertop and the countertop substrate after shaping of the countertop edge; and removing the separated edge mold portion from the countertop substrate to reveal a countertop having a finished edge on top of the countertop substrate.

* * * * *